(12) United States Patent
Hugener

(10) Patent No.: US 12,533,542 B2
(45) Date of Patent: *Jan. 27, 2026

(54) FIRE EXTINGUISHING COMPOSITION AND METHOD OF MAKING

(71) Applicant: KIDDE-FENWAL, LLC, Ashland, MA (US)

(72) Inventor: Theresa A. Hugener, Coventry, CT (US)

(73) Assignee: Kidde-Fenwal, LLC, Ashland, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,173

(22) Filed: Mar. 11, 2024

(65) Prior Publication Data

US 2024/0269500 A1    Aug. 15, 2024

Related U.S. Application Data

(63) Continuation of application No. 17/057,354, filed as application No. PCT/US2019/044863 on Aug. 2, 2019, now Pat. No. 11,964,178.

(60) Provisional application No. 62/716,605, filed on Aug. 9, 2018.

(51) Int. Cl.
 *A62D 1/00* (2006.01)

(52) U.S. Cl.
 CPC ................................. *A62D 1/0042* (2013.01)

(58) Field of Classification Search
 CPC ............................ A62D 1/0042; A62D 1/0064
 See application file for complete search history.

(56) References Cited

U.S. PATENT DOCUMENTS

| | | | |
|---|---|---|---|
| 4,999,119 A | 3/1991 | Norman et al. | |
| 5,207,932 A | 5/1993 | Norman et al. | |
| 5,391,721 A | 2/1995 | Hanen et al. | |
| 5,853,050 A * | 12/1998 | Kittle | A62D 1/0071 |
| | | | 427/244 |
| 6,051,154 A | 4/2000 | Meyer | |
| 7,172,709 B2 | 2/2007 | Clark | |
| 7,569,155 B2 | 8/2009 | Schaefer | |
| 8,366,955 B2 | 2/2013 | Thomas et al. | |
| 9,259,602 B2 | 2/2016 | Robinet et al. | |
| 9,776,029 B2 | 10/2017 | Izumida et al. | |
| 2001/0001478 A1 | 5/2001 | Dams et al. | |
| 2009/0072182 A1 | 3/2009 | Berger | |
| 2011/0073795 A1 * | 3/2011 | Thomas | A62D 1/0035 |
| | | | 252/2 |
| 2013/0220646 A1 | 8/2013 | Aldredge | |
| 2016/0166867 A1 | 6/2016 | Hansen et al. | |
| 2021/0146182 A1 | 5/2021 | Hugener | |

FOREIGN PATENT DOCUMENTS

| | | |
|---|---|---|
| CN | 102083500 A | 6/2011 |
| CN | 102294105 A | 12/2011 |
| CN | 105727491 A | 7/2016 |
| CN | 106377863 A | 2/2017 |
| CN | 106955450 A | 7/2017 |
| CN | 107812340 A | 3/2018 |
| DE | 19637908 C2 | 5/1999 |
| EP | 2201985 B1 | 2/2012 |
| GB | 2071492 A | 9/1981 |
| WO | 2006094077 A2 | 9/2006 |
| WO | 2011046188 A1 | 4/2011 |
| WO | 2017161156 A1 | 9/2017 |
| WO | 2017161162 A1 | 9/2017 |
| WO | 2018022763 A1 | 2/2018 |

OTHER PUBLICATIONS

Dr. Ramagopal Ananth. U.S. Naval Research Laboratory. Fluorine-free Foams with Oleophobic Surfactants and Additives for Effective Pool Fire Suppression. Retrieved: Aug. 9, 2018. 3 Pages.
Hetzer, R. et al. "Fire Testing a New Fluorine-free AFFF Based on a Novel Class of Environmentally Sound High Performance Siloxane Surfactants" Fire Safety Science-Proceedings of the Eleventh International Symposium, 2014, pp. 1261-1270.
International Search Report for International Application No. PCT/US2019/044863, International Application Filing Date Aug. 2, 2019. Date of Mailing Oct. 11, 2019, 18 pages.
SEPPIC. Fire Fighting Foams. Consumer demand influences new product developments. © SEPPIC 2018. Retrieved from https://www.seppic.com/fire-fighting-foam. 6 Pages.
Written Opinion for International Application No. PCT/US2019/044863, International Application Filing Date Aug. 2, 2019. Date of Mailing Oct. 11, 2019, 7 pages.

* cited by examiner

*Primary Examiner* — Andrew J. Oyer
(74) *Attorney, Agent, or Firm* — Honigman, LLP; John Chau

(57) ABSTRACT

A method of making a fire extinguishing composition comprises: forming a first aqueous solution of potassium acetate, potassium formate, or a combination thereof; forming a second aqueous solution comprising a biocide, a bio-surfactant and an optional corrosion inhibitor; combining the first aqueous solution with the second aqueous solution to form a third aqueous solution and mixing until the third aqueous solution is transparent; adding a chelating agent to the transparent third aqueous solution and mixing to form a transparent fourth aqueous solution. A fire extinguishing composition made by the method is also disclosed.

10 Claims, No Drawings

FIRE EXTINGUISHING COMPOSITION AND METHOD OF MAKING

CROSS REFERENCE TO RELATED APPLICATIONS

This application is a continuation application of application Ser. No. 17/057,354, filed Nov. 20, 2020, which is a National Stage application of PCT/US2019/044863, filed Aug. 2, 2019, which claims the benefit of U.S. Provisional Application No. 62/716,605 filed Aug. 9, 2018, all of which are incorporated by reference in their entirety herein.

BACKGROUND

Aqueous film forming foam (AFFF) compositions are useful for extinguishing a range of fire types including liquid fires and tire fires. AFFF compositions have long relied on fluorine based surfactants. There is an increasing desire to reduce or eliminate the use of fluorine compounds in many applications, including AFFF compositions.

BRIEF DESCRIPTION

Disclosed is a method of making a fire extinguishing composition comprising: forming a first aqueous solution of potassium acetate, potassium formate or a combination of thereof; forming a second aqueous solution comprising a biocide, a bio-surfactant, and an optional corrosion inhibitor; combining the first aqueous solution with the second aqueous solution to form a third aqueous solution and mixing until the third aqueous solution is transparent; adding a chelating agent to the transparent third aqueous solution and mixing to form a transparent fourth aqueous solution.

In addition to one or more of the features described above, or as an alternative to any of the foregoing embodiments, the potassium acetate may be present in an amount of 1 to 40 weight percent (wt %) based on the total weight of the fourth aqueous solution.

In addition to one or more of the features described above, or as an alternative to any of the foregoing embodiments, the potassium formate may be present in an amount of 1 to 40 weight percent (wt %) based on the total weight of the fourth aqueous solution.

In addition to one or more of the features described above, or as an alternative to any of the foregoing embodiments, the total amount of potassium salts in the fourth solution may be 30 to 55 wt %, based on the total weight of the fourth aqueous solution.

In addition to one or more of the features described above, or as an alternative to any of the foregoing embodiments, the second aqueous solution may be formed by mixing the biocide and bio-surfactant with water.

In addition to one or more of the features described above, or as an alternative to any of the foregoing embodiments, the second aqueous solution may further comprise one or more of butyl carbitol and a dye.

In addition to one or more of the features described above, or as an alternative to any of the foregoing embodiments, the third aqueous solution may be mixed for at least 8 hours at 20-35° C.

In addition to one or more of the features described above, or as an alternative to any of the foregoing embodiments, the chelating agent may be an alkyl diamine tetraacetic acid.

In addition to one or more of the features described above, the fourth aqueous solution may have a pH of 7-8.

In addition to one or more of the features described above, the fire extinguishing composition may be free of any fluorosurfactant.

Also disclosed is a fire extinguishing composition made by the method described above.

In addition to one or more of the features described above, or as an alternative to any of the foregoing embodiments, the composition may have potassium acetate is present in an amount of 1 to 40 weight percent (wt %) based on the total weight of the fourth aqueous solution.

In addition to one or more of the features described above, or as an alternative to any of the foregoing embodiments, the composition may have potassium formate is present in an amount of 1 to 40 weight percent (wt %) based on the total weight of the fourth aqueous solution.

In addition to one or more of the features described above, or as an alternative to any of the foregoing embodiments, the composition may have a total amount of potassium salts in the fourth solution of 30 to 55 wt %, based on the total weight of the fourth aqueous solution.

In addition to one or more of the features described above, or as an alternative to any of the foregoing embodiments, the second aqueous solution may further comprise one or more of butyl carbitol and a dye.

In addition to one or more of the features described above, or as an alternative to any of the foregoing embodiments, the chelating agent may be an alkyl diamine tetraacetic acid.

In addition to one or more of the features described above, or as an alternative to any of the foregoing embodiments, the fourth aqueous solution may have a pH of 7-8.

In addition to one or more of the features described above, or as an alternative to any of the foregoing embodiments, the fire extinguishing composition may be free of any fluorosurfactant.

In addition to one or more of the features described above, or as an alternative to any of the foregoing embodiments, the chelating agent may be ethylene diamine tetraacetic acid.

DETAILED DESCRIPTION

A detailed description of one or more embodiments of the disclosed method and composition are presented herein by way of exemplification and not limitation.

A method of making a fire extinguishing composition comprises: forming a first aqueous solution of potassium acetate, potassium formate or a combination thereof; forming a second aqueous solution comprising a biocide, a bio-surfactant and an optional corrosion inhibitor; combining the first aqueous solution with the second aqueous solution to form a third aqueous solution and mixing until the third aqueous solution is transparent; adding a chelating agent to the transparent third aqueous solution and mixing to form a transparent fourth aqueous solution.

Potassium acetate has the formula $KCH_3COO$. When present, the potassium acetate may be present in an amount of 1 to 40 weight percent (wt %) based on the total weight of the fourth aqueous solution. Within that range the amount of potassium acetate may be 5 to 30 wt %, or 10 to 20 wt %.

Potassium formate has the formula $KHCOO$. When present, the potassium formate may be present in an amount of 1 to 40 wt % based on the total weight of the fourth aqueous solution. Within that range the amount of potassium formate may be 5 to 30 wt %, or 10 to 20 wt %. In some embodiments the amount of potassium formate is less than the amount of potassium acetate. The total amount of potassium salts in the fourth aqueous solution may be 30 to 55 wt %, based on the total weight of the fourth aqueous solution.

The first aqueous solution may be formed by first dissolving the potassium acetate in water and then adding the potassium formate and stirring until dissolved. The solution may be heated at 30-35° C. while stirring. If insoluble impurities are present the solution may be filtered.

The second aqueous solution may be formed by combining a biocide, a bio-surfactant and an optional corrosion inhibitor with water. In some embodiments, the biocide and bio-surfactant are added first and stirred, optionally followed by a corrosion inhibitor. The second aqueous solution may further comprise one or more of butyl carbitol and a dye.

An exemplary biocide is Kathon CG/ICP manufactured by Rohm and Hass. Kathon CG/ICP comprises 5-chloro-2-methyl-4 and 2-methyl-4-isothiazolin-3-one in an inert inorganic salt solution of magnesium chloride and magnesium nitrate. The biocide may be used in an amount of 1 to 5 wt %, based on the total weight of the fourth aqueous solution.

Exemplary corrosion inhibitors include MAXHIB OA3090 available from PCC Chemax, sodium tolytriazole and combinations thereof. When present, the corrosion inhibitor may be used in an amount of 0.1 to 5 wt %, based on the total weight of the fourth aqueous solution.

Exemplary bio-surfactants include non-ionic alkyl glycosides. An exemplary non-ionic alkyl glycoside is APG 325N available from BASF. The non-ionic alkyl glycoside may be used in an amount of 1 to 10 wt %, based on the total weight of the fourth aqueous solution.

The second aqueous solution is combined with the first aqueous solution, while stirring at 20 to 35° C. Upon combination of the two aqueous solutions the mixture will become cloudy—indicating a reaction. After stirring for more than 30 minutes, the mixture will become transparent, forming the third aqueous solution. The chelating agent is then added to the transparent third aqueous solution. Upon addition of the chelating agent the mixture will become cloudy and there may be the visual appearance of bubbles—indicating a reaction. The mixture is stirred at 20-35° C. for at least 8 hours until the mixture is clear and forms the fourth aqueous solution.

Exemplary chelating agents include an alkyl diamine tetraacetic acid such as ethylene diamine tetraacetic acid (EDTA). Preferably the alkyl diamine tetraacetic acid is in the acid form. When a salt form of the alkyl diamine tetraacetic acid is used the storage stability of the mixture may be reduced as solids may form over time. The chelating agent may be used in an amount of 1 to 5 wt %, based on the total weight of the fourth aqueous solution.

The resulting fire extinguishing composition shows excellent foaming behavior and has a pH of 7-8 without the addition of any additional acid. Additionally the composition remains stable at low temperatures such as −20 to −40° C. The fire extinguishing composition is free of any fluorosurfactant.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of making a fire extinguishing composition comprising:
    forming a first aqueous solution of potassium acetate, potassium formate, or a combination thereof;
    forming a second aqueous solution comprising a biocide, a bio-surfactant and an optional corrosion inhibitor;
    combining the first aqueous solution with the second aqueous solution to form a third aqueous solution and mixing until the third aqueous solution is transparent;
    adding a chelating agent to the transparent third aqueous solution and mixing to form a transparent fourth aqueous solution,
    wherein the bio-surfactant comprises a non-ionic alkyl glycoside in an amount of 1 to 10 weight percent (wt %), based on the weight of the fourth aqueous solution.

2. The method of claim 1, wherein the potassium acetate is present in an amount of 1 to 40 weight percent (wt %), based on the total weight of the fourth aqueous solution.

3. The method of claim 1, wherein the potassium formate is present in an amount of 1 to 40 weight percent (wt %), based on the total weight of the fourth aqueous solution.

4. The method of claim 1, wherein total amount of potassium salts in the fourth solution is 30 to 55 weight percent (wt %), based on the total weight of the fourth aqueous solution.

5. The method of claim 1, wherein the second aqueous solution is formed by mixing the biocide and bio-surfactant with water.

6. The method of claim 1, wherein the second aqueous solution further comprises one or more of butyl carbitol and a dye.

7. The method of claim 1, wherein the third aqueous solution is mixed for at least 8 hours at 20-35° C.

8. The method of claim 1, wherein the chelating agent is an alkyl diamine tetraacetic acid.

9. The method of claim 1, wherein the fourth aqueous solution has a pH of 7-8.

10. The method of claim 1, wherein the fire extinguishing composition is free of any fluorosurfactant.

* * * * *